United States Patent
Bae et al.

(10) Patent No.: US 10,992,976 B2
(45) Date of Patent: Apr. 27, 2021

(54) METHOD AND DEVICE FOR PROVIDING CONTENT-RELATED INFORMATION OF MULTIMEDIA SERVICE

(71) Applicant: Samsung Electronics Co., Ltd., Suwon-si (KR)

(72) Inventors: Jae-Hyeon Bae, Seoul (KR); Dong-Yeon Kim, Seoul (KR); Kyung-Mo Park, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,935

(22) PCT Filed: Feb. 17, 2017

(86) PCT No.: PCT/KR2017/001780
§ 371 (c)(1),
(2) Date: Aug. 17, 2018

(87) PCT Pub. No.: WO2017/142347
PCT Pub. Date: Aug. 24, 2017

(65) Prior Publication Data
US 2019/0200063 A1 Jun. 27, 2019

(30) Foreign Application Priority Data
Feb. 17, 2016 (KR) .................. 10-2016-0018787

(51) Int. Cl.
*H04N 21/2362* (2011.01)
*H04N 21/24* (2011.01)
(Continued)

(52) U.S. Cl.
CPC ....... *H04N 21/2665* (2013.01); *H04N 21/239* (2013.01); *H04N 21/2362* (2013.01);
(Continued)

(58) Field of Classification Search
CPC .......... H04N 21/2665; H04N 21/2362; H04N 21/239; H04N 21/437; H04N 21/658; H04N 21/812; H04N 21/8586
(Continued)

(56) References Cited

U.S. PATENT DOCUMENTS 9,794,312 B2 * 10/2017 Thang ................ H04L 65/4084
2005/0076136 A1 4/2005 Cho et al.
(Continued)

FOREIGN PATENT DOCUMENTS

CN 102598691 A 7/2012
CN 103248611 A 8/2013
(Continued)

OTHER PUBLICATIONS

"Proposed use cases and requirements for Real-time streaming of media files", 111. MPEG Meeting; Feb. 6, 2015-Feb. 20, 2015; Geneva; (Motion Picture Expert Group 0r ISO/IEC JTC1/SC29/WG11) No. N15285, Feb. 26, 2015, XP030022011.
(Continued)

*Primary Examiner* — Nnenna N Ekpo
(74) *Attorney, Agent, or Firm* — Jefferson IP Law, LLP

(57) ABSTRACT

Disclosed are a method and a device for providing content-related information of a multimedia service. The method comprises the steps of: transmitting a signaling message comprising schedule information and delivery type information of a media content to be serviced; receiving, from at least one terminal, at least one report message comprising identification information and transfer type information of the media content; and transmitting an updated signaling
(Continued)

message on the basis of the at least one report message received from the at least one terminal receiving the media content.

16 Claims, 5 Drawing Sheets

(51) Int. Cl.
| | |
|---|---|
| H04N 21/462 | (2011.01) |
| H04N 21/658 | (2011.01) |
| H04N 21/442 | (2011.01) |
| H04N 21/437 | (2011.01) |
| H04N 21/2665 | (2011.01) |
| H04N 21/2385 | (2011.01) |
| H04N 21/2668 | (2011.01) |
| H04N 21/262 | (2011.01) |
| H04N 21/266 | (2011.01) |
| H04N 21/434 | (2011.01) |
| H04N 21/239 | (2011.01) |
| H04N 21/81 | (2011.01) |
| H04N 21/858 | (2011.01) |

(52) U.S. Cl.
CPC ..... *H04N 21/2385* (2013.01); *H04N 21/2402* (2013.01); *H04N 21/2408* (2013.01); *H04N 21/2668* (2013.01); *H04N 21/26216* (2013.01); *H04N 21/26616* (2013.01); *H04N 21/437* (2013.01); *H04N 21/4345* (2013.01); *H04N 21/44204* (2013.01); *H04N 21/4622* (2013.01); *H04N 21/658* (2013.01); *H04N 21/6582* (2013.01); *H04N 21/812* (2013.01); *H04N 21/8586* (2013.01)

(58) Field of Classification Search
USPC .......................................................... 725/109
See application file for complete search history.

(56) References Cited

U.S. PATENT DOCUMENTS

| | | | |
|---|---|---|---|
| 2005/0102371 A1 | 5/2005 | Aksu | |
| 2007/0113240 A1* | 5/2007 | McLean | H04H 60/33 725/8 |
| 2009/0276819 A1* | 11/2009 | Kim | H04N 21/4307 725/105 |
| 2012/0297410 A1 | 11/2012 | Lohmar et al. | |
| 2013/0086213 A1 | 4/2013 | Rhyu et al. | |
| 2013/0159546 A1* | 6/2013 | Thang | H04L 65/4084 709/231 |
| 2013/0179577 A1 | 7/2013 | Singh et al. | |
| 2014/0007172 A1* | 1/2014 | Rhyu | H04N 21/8456 725/109 |
| 2014/0104495 A1* | 4/2014 | Preston | H04N 21/4821 348/570 |
| 2014/0282798 A1 | 9/2014 | Hwang et al. | |
| 2014/0314080 A1 | 10/2014 | Park et al. | |
| 2014/0371894 A1 | 12/2014 | Shan et al. | |
| 2014/0372624 A1* | 12/2014 | Wang | H04L 69/18 709/231 |
| 2015/0020138 A1* | 1/2015 | Bae | H04N 21/238 725/116 |
| 2015/0113548 A1* | 4/2015 | Stern | H04N 21/4826 725/9 |
| 2015/0113577 A1 | 4/2015 | Yie et al. | |
| 2015/0150055 A1 | 5/2015 | Hwang et al. | |
| 2016/0036881 A1 | 2/2016 | Tembey et al. | |
| 2016/0078901 A1* | 3/2016 | Toma | H04N 21/643 386/355 |
| 2016/0330495 A1* | 11/2016 | Kwak | H04N 21/2665 |
| 2017/0048560 A1 | 2/2017 | Tanaka et al. | |
| 2017/0163945 A1 | 6/2017 | Oh et al. | |
| 2018/0324492 A1* | 11/2018 | Deshpande | H04N 21/4126 |

FOREIGN PATENT DOCUMENTS

| | | |
|---|---|---|
| CN | 103843351 A | 6/2014 |
| CN | 104350760 A | 2/2015 |
| EP | 2849440 A1 | 3/2015 |
| JP | 2013-510453 A | 3/2013 |
| JP | 2015-507882 A | 3/2015 |
| JP | 2015-527788 A | 9/2015 |
| KR | 10-2008-0108568 A | 12/2008 |
| KR | 10-2013-0090824 A | 8/2013 |
| WO | 2012-030178 A2 | 3/2012 |
| WO | 2013-119023 A1 | 8/2013 |
| WO | 2015/146378 A1 | 10/2015 |
| WO | 2015-156618 A1 | 10/2015 |

OTHER PUBLICATIONS

Thorsten Lohmar: Discussion on use-cases and technical realizations, 112. MPEG Meeting; Jun. 22, 2015-Jun. 26, 2015; Warsaw; (Motion Picture Expert Group or ISO/IEC JTC1/SC29/WG11) No. m36460, Jun. 19, 2015, XP030064828.
Qualcomm Incorporated: Aggregation—Dynamic Unicast-Broadcast Switching, 3GPP Draft; S4-130909 MI-MooD-MBMS-Unicast, 3rd Generation Partnership Project (3GPP), Mobile Competence Centre ; 650, Route Des Lucioles ; F-06921 Sophia-Antipolis Cedex; France X MI-MooD: Content 1,7,13.
Tiling Xu et al: Accessible Time Window, 113. MPEG Meeting; Oct. 19, 2015-Oct. 23, 2015; Geneva; (M0ti0n Picture Expert Group 0r ISO/IEC JTC1/SC29/WG11) No. m37442, Oct. 20, 2015, XP030065810.
Murphy A J et al: II 4G Broadcast: Can Lie 1-14 EMBMS Help Address the Demand for Mobile Video?, IBC 2015 Conference, Sep. 11-15, 2015, Amsterdam Sep. 11, 2015, XP030082542.
EP Search Report dated Dec. 6, 2018 issued in EP Application 17753508.5.
Chinese Office Action with English translation dated May 8, 2020; Chinese Appln. No. 201780011779.9.
Yuste et al.; Understanding Timelines within MPEG Standards. Communications Surveys and Tutorials, IEEE Communications Society; vol. 18, Issue 1, First quarter 2016; Oct. 7, 2015; URLHttps://ieeexploreieee.org/stamp/stamp.jsp?tp=\arnuMember=7293587.
Japanese Office Action with English translation dated Feb. 12, 2021; Japanese Appln. No. 2018-543683.

* cited by examiner

METHOD AND DEVICE FOR PROVIDING CONTENT-RELATED INFORMATION OF MULTIMEDIA SERVICE

CROSS-REFERENCE TO RELATED APPLICATION(S)

This application is a U.S. National Stage application under 35 U.S.C. § 371 of an International application number PCT/KR2017/001780, filed on Feb. 17, 2017, which is based on and claimed priority of a Korean patent application number 10-2016-0018787, filed on Feb. 17, 2016, in the Korean Intellectual Property Office, the disclosure of which is incorporated by reference herein in its entirety.

TECHNICAL FIELD

The present disclosure relates to a method and apparatus for providing information related to a content which composes a multimedia service in a multimedia service system.

BACKGROUND ARTS

According to explosive growth of wired and wireless internets, various types of internet televisions (TVs) will be meaningful part of everyday life in the future. It is expected that mobile video traffic will account for considerable amount of total mobile data traffic in the future according to rapid increase of mobile data traffic. In this case, mobile data traffic is also increased significantly at certain times, a problem that watch through a smart phone is not smoothly provided may occur.

As a demand for a real-time live broadcasting service through mobile terminals increases, a service provider needs to develop a related supplementary service, and there is a need for a scheme of effectively managing mobile traffic at the same time. An enhanced Multimedia Broadcast and Multicast Service (eMBMS) as a technology for Long Term Evolution (LTE) broadcast has been proposed as one of solutions for this. The LTE broadcast may use an LTE frequency as it is and adopt a multicast transmission scheme to decrease traffic load, and may support various new services such as an area-based advertisement, a content business, and/or the like as well as a mobile broadcasting. Like this, a ground wave broadcasting, and/or the like as well as the mobile broadcasting transmits a main content and various supplementary information through various transmission channels such as a broadband channel, a Wifi channel, and/or the like as well as an existing ground wave channel, so various new services may be provided. However, at this time, it is also important to decrease traffic load.

An existing streaming scheme which transmits a media content using a hyper text transfer protocol (HTTP) generates media resource identification information which provides a location of a media source along with meta data of the media content upon generating the media content. For example, when a media content of 10 minutes is converted to an HTTP-based file format for streaming through an internet, media resource identification information indicating a content server which provides the media content of 10 minutes is included in meta data of the media content in a form of a uniform resource locator (URL), and the meta data is transmitted to a receiver. After receiving the meta data, the receiver requests transmission of a media content for a streaming service which a user wants from an HTTP-based content server based on the media resource identification information (e.g., a URL) stored at the meta data.

This existing streaming scheme has various problems in an actual real-time streaming environment. For example, media resource identification information (i.e., a URL) used in an HTTP scheme does not indicate an actual address (e.g., an IP address) of a content server, so a receiver needs to transmit request for searching the actual address of the content server to a domain name system (DNS) server in order to access the content server, and delay occurs due to this.

Further, in an existing streaming service, an address of a content server is maintained for a determined file duration, real-time update on media resource identification information according to dynamic channel change is impossible, so it is difficult for a receiver to adapt to dynamic channel change within one program while receiving a corresponding streaming service.

Finally, it needs to detect the number of users who use each media content channel to perform resource allocation suitable for the number of users for effective network management when a service of a multicast scheme is provided, however, it is difficult to detect the number of users who access a corresponding channel to use a service in an existing streaming service.

SUMMARY

The present disclosure provides a method and apparatus for transmitting and receiving a signal in a multimedia service system.

The present disclosure provides a method and apparatus for performing effective network management according to a network situation upon providing a streaming service of a media content.

The present disclosure provides a method and apparatus for supporting a real-time service using media resource identification information in multimedia service.

A method for controlling provision of a multimedia service according to an embodiment of the present disclosure is provided, and the method includes transmitting a signaling message including scheduling information and delivery type information of a media content to be serviced, receiving at least one report message including identification information and delivery type information of the media content from at least one terminal, and transmitting a signaling message which is updated based on the at least one report received from the at least one terminal which receives the media content.

A method for receiving a multimedia service according to an embodiment of the present disclosure is provided, and the method includes receiving a signaling message including schedule information and a delivery type information of a media content to be serviced, transmitting a report message including identification information and delivery type information of the media content, receiving a signaling message which is updated based on the report message, and receiving the media content based on at least one of the signaling message and the updated signaling message.

A transmitting apparatus for controlling provision of a multimedia service according to an embodiment of the present disclosure is provided, and the transmitting apparatus includes a transceiver configured to transmit a signaling message including scheduling information and delivery type information of a media content to be serviced, and to receive at least one report message including identification information and delivery type information of the media content from at least one terminal, and a processor configured to generate a signaling message which is updated based on the at least one report received from the at least one terminal which receives the media content and to transmit the updated signaling message by the transceiver.

A receiving apparatus for receiving a multimedia service according to an embodiment of the present disclosure is provided, and the receiving apparatus includes a transceiver configured to receive a signaling message including schedule information and a delivery type information of a media content to be serviced, to transmit a report message including identification information and delivery type information of the media content, to receive a signaling message which is updated based on the report message, and to receive the media content based on at least one of the signaling message and the updated signaling message, and a processor configured to generate the report message.

BRIEF DESCRIPTION OF DRAWINGS

The above and other aspects, features and advantages of various embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF THE DISCLOSURE

Figure 1:
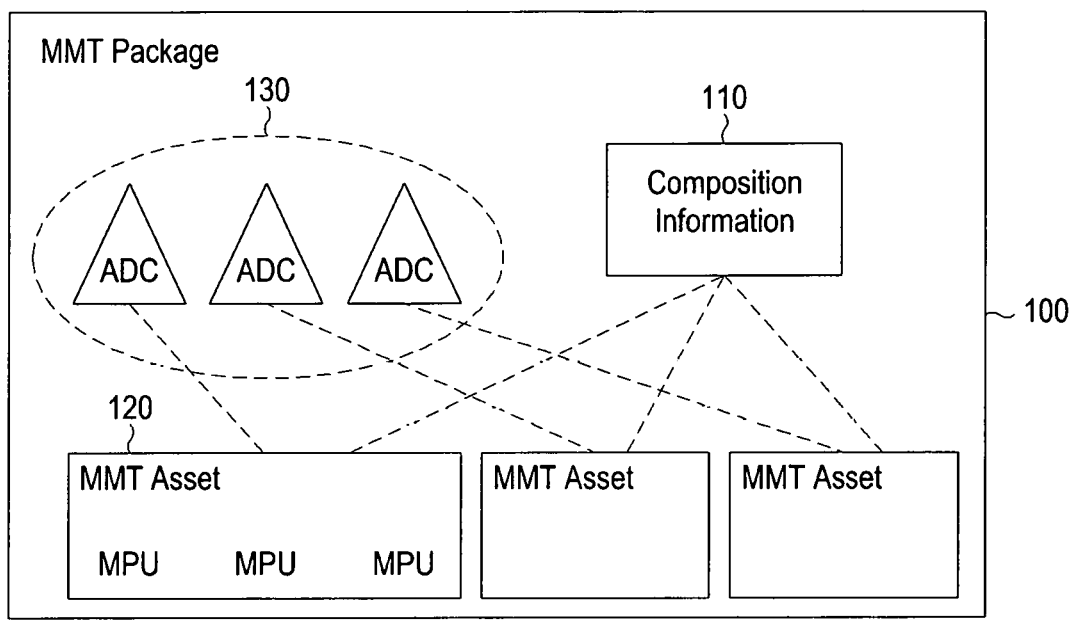
FIG. 1 illustrates a logical structure of a media package according to an embodiment of the present disclosure.

Various embodiments of the present disclosure will be described with the accompanied drawings.

A description of techniques which are known in the technical field of the present disclosure and are not related directly to the present disclosure will be omitted lest it should obscure the subject matter of the present disclosure.

Likewise, some components are exaggerated, omitted, or schematically shown in the attached drawings and the size of each component does not fully reflect its actual size. Like reference numerals denote the same or corresponding components in the drawings.

The advantages and features of embodiments of the present disclosure, and a method for achieving them will be apparent from the attached drawings and the following detailed description of embodiments. However, the present disclosure may be implemented in various ways, not limited to the following embodiments. Rather, the embodiments are provided to make the present disclosure comprehensive and help those skilled in the art to comprehensively understand the scope of the present disclosure, and the present disclosure is defined only by the appended claims. The same reference numerals denote the same components throughout the specification.

Further, blocks of a flowchart and a combination of flowcharts may be executed by computer program instructions. Since these computer program instructions may be loaded on a processor of a general purpose computer, a special purpose computer, or other programmable data processing equipment, the instructions executed by the processor of the computer or other programmable data processing equipment create means for carrying out functions described in the block(s) of the flowcharts. As the computer program instructions may be stored in a memory usable in a specialized computer or a programmable data processing equipment, or a computer readable memory, it is also possible to create articles of manufacture that carry out functions described in the block diagram(s) of the flowcharts. As the computer program instructions may be loaded on a computer or a programmable data processing equipment, when executed as processes, they may carry out steps of functions described in the block(s) of the flowcharts.

Each block may correspond to a module, a segment or a code containing one or more executable instructions implementing one or more specified logical functions. It is to be noted that in alternative embodiments, it is also possible to execute functions described in blocks in an order different from the listed order. For example, two blocks listed in sequence may be executed substantially at the same time or executed in reverse order according to corresponding functions, when needed.

In the description, the word 'unit', 'module' or the like may refer to a software component or hardware component such as a field-programmable gate array (FPGA) or application-specific integrated circuit (ASIC). However, 'unit' or the like is not limited to hardware or software. A unit or the like may be configured so as to reside in an addressable storage medium or to drive one or more processors. Therefore, units or the like may refer to components such as software components, object-oriented software components, class components, and task components, processes, functions, attributes, procedures, subroutines, program code segments, drivers, firmware, microcode, circuits, data, databases, data structures, tables, arrays, and variables. A function provided by a component and 'unit' may be a combination of smaller components and 'units', and may be combined with others to compose large components and units. Components and units may be configured to drive a device, or one or more central processing units (CPUs) in a secure multimedia card.

In embodiments of the present disclosure, a multimedia service system for providing a streaming service which supports a Moving Picture Experts Group (MPEG) media transport (MMT)-based media content will be described as a main subject, however, a primary subject to be claimed in the specification may be also applied to other communication systems and services which have similar technical background without departing a scope disclosed in the specification, and this is possible by determination of a skilled person in this field.

Prior to describing embodiments of the present disclosure in detail, a data structure defined in an MMT standard will be described. In the MMT standard, multimedia data packets are defined as a delivery frame for an MMT service. An MMT Protocol (MMTP) defines an application layer protocol for delivering a delivery frame configured with an MMT Payload Format (PF) through an IP network. An MMT payload is generated with an MMT payload format, and is designed such that the MMT payload may be effectively delivered. For effectively delivering MPEG media data through heterogeneous IP networks, MMT defines encapsulation formats, delivery protocols, and signaling message formats.

An MMT payload is specified by a payload format for transmitting an encapsulated data unit, or other information by an MMT layer protocols or other existing application transport protocols. The MMT payload provides information about streaming and information about tile transfer. In streaming, a data unit may be a Media Fragment Unit (MFU) or a Media Processing Unit (MPU). In a case of file transfer, a data unit may be a media asset and a media package. Here, an MPU is a generic container for real time (timed) or non-real time (non-timed) data which may be independently decoded, and an MFU denotes one fragment of an MPU. For example, in a case that encoding is performed using one frame as an access unit, an MFU may be one video frame. In other cases, an MFU may be one slice included in one frame.

An MPU is a container format which includes one or more MFUs and information related to additional delivery and processing, and may include various numbers of MFUs which are generated from a plurality of different access units. An MPU denotes an encoded media data unit which may be completely and independently processed by an MMT compliant entity, and may have a specific size according to an application environment, for example, 1 Group of Picture (GOP) in a case of a video. For example, an MPU may consist of a plurality of picture frames which composes 1 GOP (e.g., one second of video), and an MFU may include each picture frame.

An media asset is a data entity which consists of a logical group of one or more MPUs, and is the largest data unit to which the same composition information (CI) and a transport characteristic are applied. An media asset includes only one type of data including packaged or multiplexed data. For example, at least part of an Elementary Stream (ES) of audio, at least part of an ES of a video, an MPEG-User Interface (MPEG-U) widget package, at least part of an MPEG-2 Transport Stream (TS), at least part of an MPEG-4 (MP4) file, and all or at least part of an MMT package may be each media asset.

Here, an elementary streams (ES) is defined by a specific media codec, and may be logically one or more MMT assets. An MMT asset 230 which supports a layered codec and a multi-view codec may be overlapped with other MMT assets.

Composition information (CI) means information defining spatial and temporal relationship of MMT assets, and MMT Transport Characteristics (MMT-TC) define a Quality of Service (QoS) required for delivering MMT assets. MMT-TC may be expressed as Asset Delivery Characteristics (ADC) for a specific delivery environment.

A media package is defined as a collection of encoded media data and related information which are processed by an MMT compliant entity.

FIG. 1 illustrates a logical structure of a media package according to an embodiment of the present disclosure.

Referring to FIG. 1, a media package 100 consists of one or more media assets 120, composition information 110, and one or more ADCs 130 indicating a media transport characteristic. The media package 100 includes description information such as an identifier and a location of the media assets 120, and the media assets 120 within the media package 100 may he multiplexed or concatenated.

Processing of a media package 100 is applied on an MPU basis, the media asset 120 is a collection of one or more MPUs with the same asset ID, and a transport characteristic related to each media asset 120 is expressed by the ADCs 130. The ADCs 130 may be used for an entity which packetizes the media package 100 to generate header information of an MMT packet along with parameters of an MMT payload.

An MMT payload may be transmitted to a receiving entity through an HTTP-based streaming service.

Figure 2:
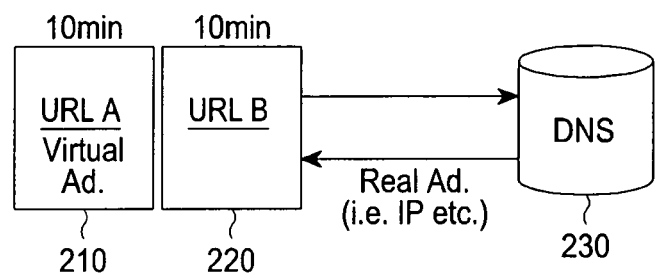
FIG. 2 illustrates a diagram for explaining provision of an HTTP-based streaming service.

FIG. 2 illustrates a diagram for explaining provision of an HTTP-based streaming service.

Referring to FIG. 2, the first file 210 includes a media resource identification information URL A, and the second file 220 includes a media resource identification information URL B. A receiving entity receives the second file 220 and requests an IP address which the receiving entity may access a content server which provides a media content of the URL B from a DNS server 230 based on the URL B. The receiving entity may access the content server based on the IP address to access a media content which a user wants.

As described above, a location of a media resource for a streaming service is provided through media resource identification information for using a media content service. The media resource identification information may be generated by collecting media content configuration information provided by a content provider (CP) and media resource allocation information provided by a service provider (SP).

Further, a user terminal which operates as a receiving entity consuming a service may transmit media resource allocation information and consumption reporting information for a media content which a user is watching using a signaling message. The signaling message provides a sending entity which may be a content provider or a service provider (SP) with identification information for received media packets. A sending entity which supports dynamic multimedia delivery may be a server of a network provider which manages a network used by a user terminal, and checks a situation of a network in which users currently use a streaming service based on the consumption reporting information to support effective provision of a media service.

In an embodiment, current media resource identification information which provides a location of a media resource may be provided from a content provider to a user terminal which uses a media service through a media resource identification (MRI) message. In an embodiment, the MRI message may be transmitted in-band through the same channel as media data or may be transmitted out-of-band though a channel different from the media data when a session is started.

The following <Table 1> shows a format of an MRI message according to an embodiment of the present disclosure, and the MRI message may include at least one of message fields to be described below.

TABLE 1

| Syntax | Value | No. of bits | Mnemonic |
|---|---|---|---|
| MRI_message ( ) { | | | |
|     message_id | | 16 | uimsbf |
|     version | | 8 | uimsbf |
|     length | | 16 | uimsbf |
|     message_payload{ | | | |
|         number_of_MMT_package | N1 | 8 | uimsbf |
|         for (i=0; i<N1; i++) { | | | |
|             MMT_package_id { | | | |
|                 MMT_package_id_length | N2 | 8 | uimsbf |
|                 for (i=0; i<N2; i++) { | | | |
|     MMT_package_id_byte | | 8 | uimsbf |
|                 } | | | |
|             } | | | |
|         delivery_type | | 4 | uimsbf |
|         reserved | | 4 | uimsbf |
|         number_of_assets | N3 | 8 | uimsbf |
|         for (i=0; i<N3; i++) { | | | |
|             asset_id( ) | | | |
|             location_count | N4 | 8 | uimsbf |
|             for (i=0; i<N4; i++) { | | | |
| mpu_sequence_start_number | | 32 | uimsbf |
| mpu_sequence_end_number | | 32 | uimsbf |
| MMT_general_location_info( ) | | | |
|                 valid_time_start | | 64 | uimsbf |
|                 valid_time_duration | | 64 | uimsbf |
|             } | | | |
|         } | | | |
|         consumption_server_address{ | | | |
| MMT_general_location info( ) | | | |
|         } | | | |
|     } | | | |
| } | | | |

Here, a message_id field indicates an identifier of the MRI message, and a version field indicates a version of the MRI message. A receiving entity may determine whether the MRI message is new based on the version field. A length field indicates a length of the MRI message in bytes. Fields included in message_payload will be described beluw.

A number_of_MMT_package field indicates the number of media packages. An MMT_package_id field is a unique identifier of a corresponding media package to be serviced, and consists of an MMT_packet_id_length field (=N1) and N1 MMT_package_id_byte fields. The MMT_packet_id_length field indicates a length of MMT_package_id in bytes.

A delivery_type field indicates a type of media session for delivering a media package, for example, one of broadcast delivery only, unicast delivery only, and hybrid delivery.

A number_of_assets field provides the number of assets within each media package and an asset_id field is an identifier of an asset included in a corresponding media package, and a location_count field means the number of location information for one asset. That is, location_count is set to '1' if one asset is provided through one location, and the location_count is set to a value which is not '1' if bulk transmission in which MPUs included in one asset are transmitted through multi-channels is used.

An mpu_sequence_start_number field indicates the first MPU serial number at each location within one asset, an mpu_sequence_end_number field indicates the last MPU serial number at each location within one asset, and an MMT_general_location_info field is configuration information related to a media content and may provide location information of an asset containing the media content. The location information may indicate a resource server which is identical to a content server which provides the MRI message or which is different from the content server. A valid_time_start field and a valid_time_duration field indicate valid start time and a valid time duration of a media session, and consumption_server_address includes an MMT_general_location_info field indicating a location of a server which receives a measurement result from each receiving entity. Effective time of the media session may be defined in various schemes Instead of the valid_time_start held and the valid_time_duration field.

In one embodiment, a user terminal may transmit a signaling message, i.e., a consumption reporting (CR) message, which may include at least one of message fields as shown in <Table 2> to a sending entity or a 3rd party application server. The sending entity may count the number of receiving entities which receive a media packet of a specific media content using the CR message and may determine a delivery type.

TABLE 2

| Syntax | Value | No. of bits | Mnemonic |
|---|---|---|---|
| CR_message ( ) { | | | |
|     message_id | | 16 | uimsbf |
|     version | | 8 | uimsbf |
|     length | | 16 | uimsbf |

TABLE 2-continued

| Syntax | Value | No. of bits | Mnemonic |
|---|---|---|---|
| message_payload{ | | | |
|     MMT_package_id { | | | |
|         MMT_package_id_length | N1 | 8 | uimsbf |
|         for (i=0; i<N1; i++) { | | | |
|             MMT_package_id_byte | | 8 | uimsbf |
|         } | | | |
|     } | | | |
|     mobile_information_descriptor( ) | | | |
|     number_of_assets | N2 | 8 | uimsbf |
|     for (i=0; i<N2; i++){ | | | |
|         asset_id( ) | | | |
|         mpu_timestamp_descriptor( ) | | | |
|         delivery_type( ) | | 4 | uimsbf |
|         reserved | | 4 | uimsbf |
|     } | | | |
| } | | | |
| } | | | |

Here, description of a message_id field, a version field, and a length field is the same as <Table 1>.

As shown in <Table 2>, a CR message transmitted from a user terminal to a sending entity may include information about effective time (e.g., a valid_time_start field and a valid_time_duration field) and information about a delivery type (e.g., delivery_type field) received through an MRI message.

Additionally, the CR message may include an MMT_package_id field and an asset_id field as information for continuous reception of a media content which a user is watching. A server may detect a channel type and consumption reporting information which users of a corresponding media service are using based on CR messages collected from a plurality of user terminals.

Here, MMT_package_id is a unique identifier of a package which a user terminal receives, and consists of an MMT_packet_id_length field (=N1), and N1 MMT_package_id_byte fields. If the user terminal is a mobile device, a mobile_information_descriptor field may be included. The user terminal includes a mobile_information_descriptor field including a terminal identifier and a cell identifier which are defined in a cellular network into the CR message.

A number_of_assets field indicates the number of assets, and an asset_id field, an mpu_timestamp_descriptor field, and a delivery_type field are included for each asset. The asset_id field indicates an identifier of an asset included in a corresponding media package, and the mpu_timestamp_descriptor field may provide presentation time for the first asset of a corresponding MPU. The delivery_type field indicates a type of a media session for delivering a media package, for example, one of broadcast delivery only, unicast delivery only, and hybrid delivery.

Further, the CR message may include consumption_server_address indicating an address of a server.

A user terminal receives an MRI message which may be generated as shown in <Table 1>, and determines whether the MRI message includes updated information by checking a message version within a version field. If the message version is identical to a message version of a previously received MRI message, the user terminal operates based on information of the MRI message which is previously received and stored. If the message version is updated compared to the previous message version or there is no information about a previous message version, the user terminal will operate as the following.

The user terminal identifies next media data to be received of a media service which is currently provided using an MMT_package_id field, an asset_id field, an mpu_sequence_start_number field, and an mpu_sequence_end_number field included in a payload of the received MRI message, and recognizes effective start time and time duration for a transmission channel of the media service which is currently provided using a valid_time_start field and a valid_time_duartion field. Further, the user terminal detects location information (i.e., an address) of a server which provides the media service based on an MMT_general_location_info field within the MRI message, and uses the media service by requesting the media service from the server based on the detected location information. The media service is delivered to the user terminal through a transmission channel which is defined by a delivery_type field.

A user terminal may transmit consumption reporting information for a media service which is currently being used to a sending entity such as a content provider or a service provider using a CR message. The sending entity may update information of an MRI message to be provided to one or more user terminals based on the consumption reporting information collected from the user terminals to support effective provision of a service.

In one embodiment, a user terminal may transmit a client identifier (client id) which identifies the user terminal through a CR message to a sending entity such as a content provider or service provider. The sending entity may identify the number of users who are using each transmission channel/media content by collecting at least one client identifier reported from at least one user terminal, and refer to the number of the identified users to provide a streaming service which is suitable for a network.

Figure 3:
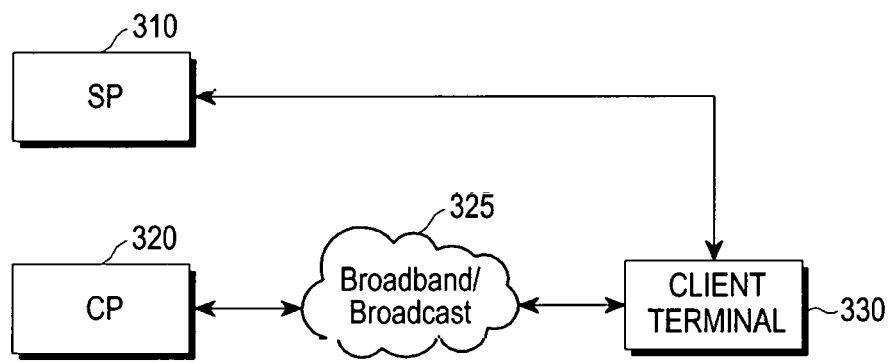
FIG. 3 illustrates a system structure for providing a multimedia service according to an embodiment of the present disclosure.

FIG. 3 illustrates a system structure for providing a multimedia service according to an embodiment of the present disclosure. A system structure in a case that a content provider is different from a service provider is shown in FIG. 3.

Referring to FIG. 3, a client terminal 330 which operates as a receiving entity may be a mobile device or a user terminal, and access a media content of a desired multimedia service from a content provider (CP) 320. A service provider (SP) 310 monitors a network situation and manages a transmission channel of a client terminal 330 such that the client terminal 330 may use a seamless service. The client terminal 330 may access the content provider 320 through a unicast type-broadband channel and/or a broadcast type-broadcast channel 325.

Figure 4:
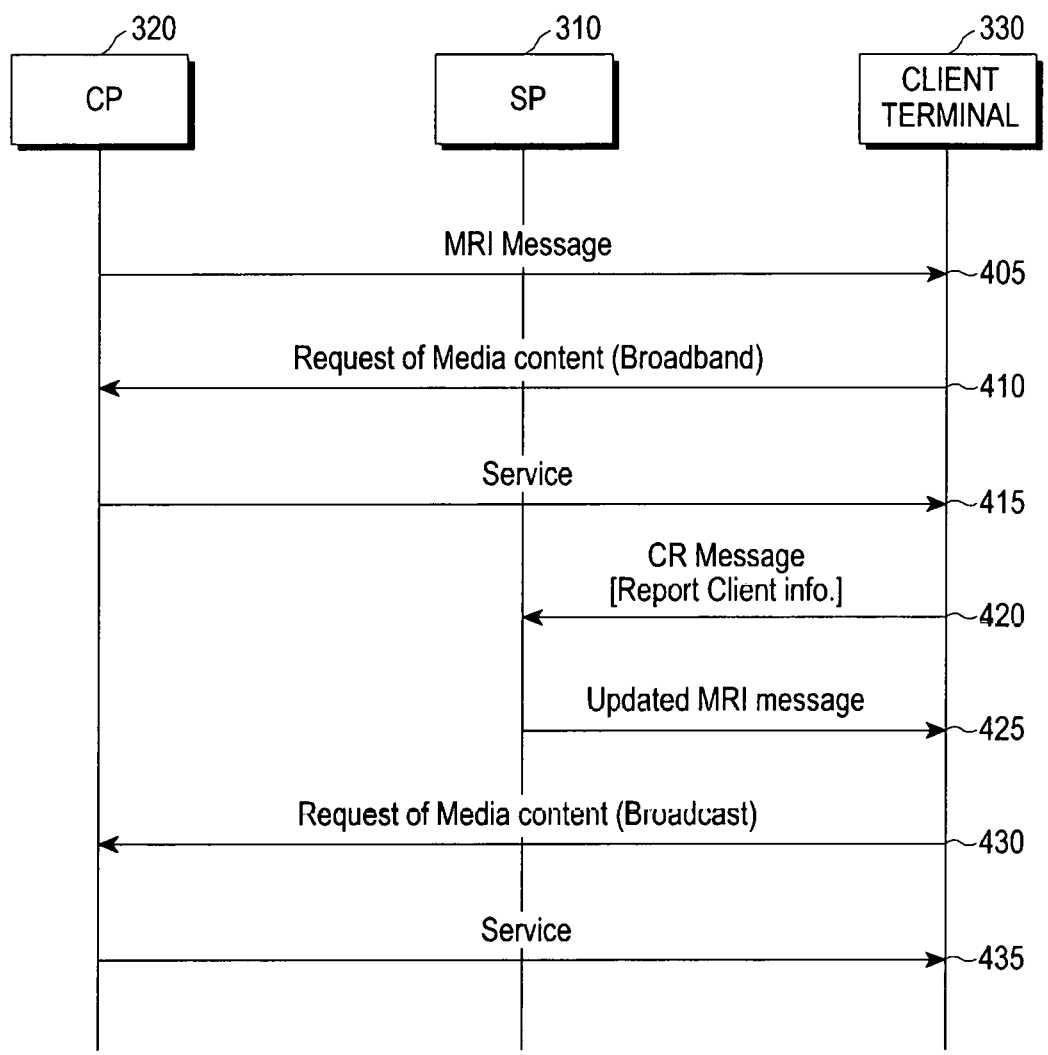
FIG. 4 illustrates a signal flowchart showing a streaming service procedure according to an embodiment of the present disclosure.

FIG. 4 illustrates a signal flowchart showing a streaming service procedure according to an embodiment of the present disclosure. An operation in a case that a content provider 320 is different from a service provider 310 in a streaming service which supports an MMT-based media content is shown in FIG. 4.

Referring to FIG. 4, in operation 405, the content provider 320 transmits an MRI message including media resource identification information, and the MRI message is received by a client terminal 330. The MRI message content is generated based on configuration information of a media content which the content provider 320 provides (e.g., MMT_general_location_info), and configuration information related to a transmission schedule of the service provider 310 (e.g., mpu_sequnce_start_number, mpu_sequence_end_number, valid_time_start, valid_time_duration, and delivery_type).

In one embodiment, an MMT-based signaling message (such as an MRI message as described above) is generated along with a media content when MMT-based media is generated, the content provider 320 may include MMT_general_location_info as configuration information related to the media content and at least one of mpu_sequnce_start_number, mpu_sequence_end_number, valid_time_start, valid_time_duration, and delivery_type related to basic transmission into the signaling message to transmit the signaling message to the service provider 310, and a server of the service provider 310 updates the configuration information related to the transmission to respond the updated configuration information to the content provider 320. The updated information is transmitted to the client terminal 330 in the MRI message. In operations 410 and 415, the client terminal 330 may seamlessly access a streaming service of a media content which is currently provided by the content provider 320 based on the MRI message. Specifically, the client terminal 330 may receive MPUs which correspond to the mpu_sequnce_start_number and the mpu_sequence_end_number among MPUs of an media asset stored at location information indicated by the MMT_general_location_info during effective time which corresponds to the valid_time_start and the valid time duration.

In operation 420, the client terminal 330 feeds back, to the service provider 310, consumption reporting information for a media content which the client terminal 330 currently watches through a CR message. The CR message may be periodically transmitted and/or may be transmitted according to an event. The service provider 310 may identify the number of users who use each service based on the CR message and CR messages received from other client terminals, and update information of an MRI message based on the number of identified users. In operation 425, the MRI message including the updated information is transmitted. The client terminal 330 may receive the MRI message and may seamlessly receive the media content based on the updated information included in the MRI message. It is possible to perform effective network management and provide users with a seamless service at the same time through the update of the MRI message.

In one embodiment, the content provider 320 generates an MRI message related to a media content and transmits the MRI message (operation 405). Terminals related to the media content as well as the client terminal 330 transmit request for a media content from the content provider 320 using a channel of a broadband network based on a value of a delivery_type field included in the MRI message (operation 410), and receives media packets including MPUs of the media content in response to the request (operation 415). The client terminal 330 transmits consumption reporting information for the media content and signaling information related to this to the service provider 310 through a CR message while receiving the media content or after receiving the media content (operation 420).

The service provider 310 may determine the number of users per media service based on the CR message, and determine a delivery type of a transmission channel to be used for providing a corresponding media service based on the number of the identified users. For example, if the number of users who use a specific media service is greater than or equal to a predetermined threshold value, the service provider 310 determines to switch the transmission channel of the media service from a broadband channel to a broadcast channel, and transmits an MRI message including updated delivery_type according to the determined result (operation 425).

The client terminal 330 transmits request for the media service to the content provider 320 in response to reception of the updated MRI message in operation 430, and may continuously receive a media content of the media service in operation 435.

Figure 5:
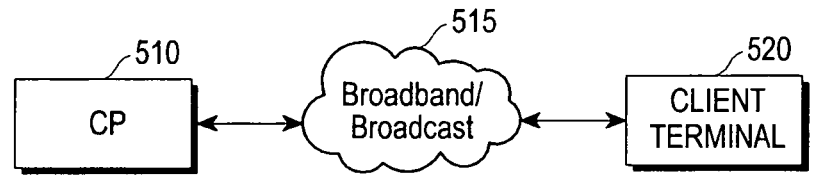
FIG. 5 illustrates a system structure for providing a multimedia service according to an embodiment of the present disclosure.

FIG. 5 illustrates a system structure for providing a multimedia service according to an embodiment of the present disclosure. A system structure in a case that a content provider generates an MRI message and transmits the MRI message is shown in FIG. 5.

Referring to FIG. 5, a client terminal 520 receives a media content of a desired multimedia service from a content provider 510. The content provider 510 may monitor a network situation to provide media resource information for a transmission channel to be used for the client terminal 520 to receive the multimedia service through an MRI message. The client terminal 520 may access the content provider 510 through a broadband channel and/or a broadcast channel 515 based on information of the MRI message.

Figure 6:
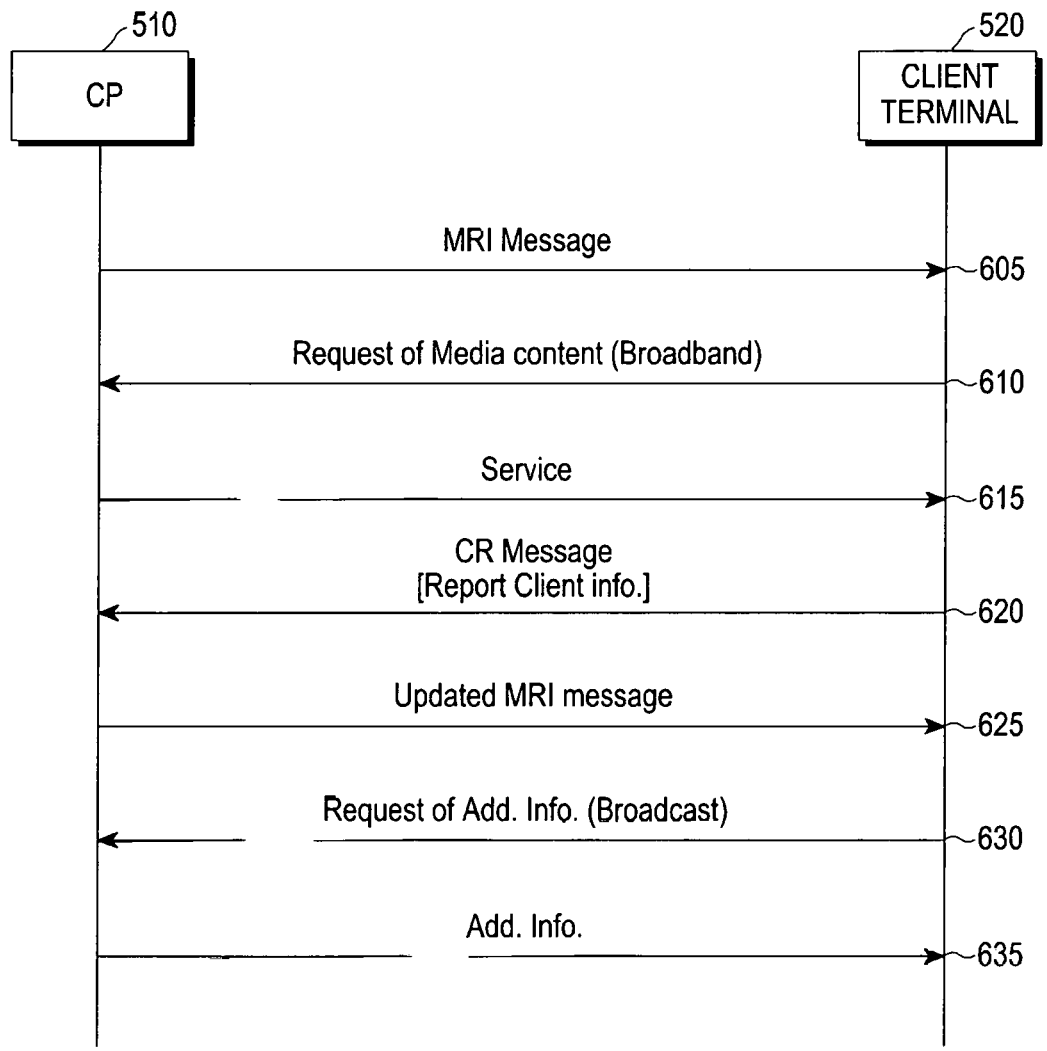
FIG. 6 illustrates a signal flowchart showing a streaming service procedure according to an embodiment of the present disclosure.

FIG. 6 illustrates a signal flowchart showing a streaming service procedure according to an embodiment of the present disclosure. An operation in a case that a content provider 510 provides an MRI message and a media content in a streaming service which supports an MMT based-media content is shown in FIG. 6.

Referring to FIG. 6, in operation 605, a content provider 510 generates an MRI message including configuration information of a media content (e.g., MMT_general_location_info), and configuration information related to a transmission schedule of the media content in which status of a network managed by the content provider 510 is reflected (e.g., mpu_sequence_start_number, mpu_sequence_end_number, valid_time_start, valid_time_duration, and delivery_type), and transmits the MRI message. The MRI message may be received by a client terminal 520.

In one embodiment, an MMT-based signaling message (e.g., an MRI message as described above) is generated along with a media content when MMT-based media is generated, and the content provider 510 includes at least one of MMT_general_location_info as configuration information related to the media content, and mpu_sequnce_start_number, mpu_sequence_end_number, valid_time_start, valid_time_duration, and delivery_type as configuration information related to basic transmission into the signaling message, and transmits the signaling message. In operations 610 and 615, a client terminal 520 may seamlessly access a streaming service of a media content which is currently provided by the content provider 510 based on the MRI message.

In operation 620, the client terminal 520 feeds back consumption reporting information about a media content which the client terminal 520 currently watches to the content provider 510 through a CR message. The CR message may be periodically transmitted or may be transmitted according to an event. The content provider 510 may detect the number of users who use each media service based on the CR message and CR messages received from other client terminals, and update information of the MRI message based on the number of detected users. In operation 625, the MRI message including the updated information is transmitted. The client terminal 520 may receive the MRI message and may seamlessly receive the media content based on the updated information included in the MRI message. It is possible to perform effective network management and provide users with a seamless service and additional services at the same time through the update of the MRI message.

In one embodiment, the content provider 510 generates an MRI message related to a media content, and transmits the MRI message to users of a corresponding media service as well as the client terminal 520 (operation 605). The client terminal 520 receives a media content of the media service through a transmission scheme provided by the content provider 510, e.g., a broadcast channel of a broadcast network based on a delivery_type field included in the MRI message (operation 615). The client terminal 520 transmits consumption reporting information for a media content which the client terminal 520 currently uses and signaling information related to this to the content provider 510 through a CR message while receiving the media content or after receiving the media content (operation 620).

The content provider 510 determines the number of users per media service based on the CR message, and determines a delivery type of a transmission channel to be used for providing a corresponding media service and/or additional information of the media service (e.g., additional language subtitles, polarization broadcasting, and/or the like) based on the number of the determined users. For example, if the number of users who use a specific media service reaches a predetermined threshold value, the content provider 510 determines to switch a transmission channel of the media service from an existing transmission channel to another channel such as an internet channel, and/or the like, and transmits an MRI message including delivery_type which is updated according to the determined result to the client terminal 520 (operation 625).

The client terminal 520 transmits, to the content provider 510, request for the media service in response to reception of the updated MRI message in operation 630, and may continuously receive a media content of the media service in operation 635.

Figure 7:
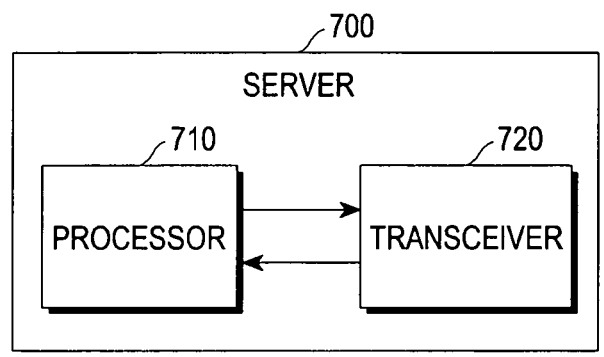
FIG. 7 illustrates a block diagram of a server which composes a content provider or a service provider according to an embodiment of the present disclosure.

FIG. 7 illustrates a block diagram of a server operating as a sending entity according to an embodiment of the present disclosure.

Referring to FIG. 7, a server 700 includes a transceiver 720 to communicate a signaling message and a media content with another server and/or a client terminal, and a processor 710 to process a message and a content processed by the transceiver 720. In an embodiment, the processor 710 may generate information included in an MRI message to be transmitted by the transceiver 720, and analyze information included in an CR message received by the transceiver 720.

Figure 8:
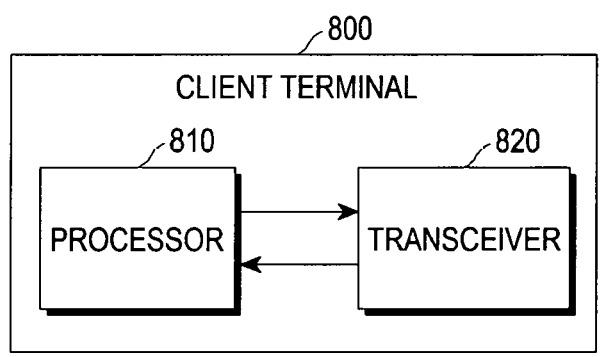
FIG. 8 illustrates a block diagram of a client terminal according to an embodiment of the present disclosure.

FIG. 8 illustrates a block diagram of a client terminal operating as a receiving entity according to an embodiment of the present disclosure.

Referring to FIG. 8, a client terminal 800 includes a transceiver 820 to communicate a signaling message and a media content with a sending entity which may be a content provider or a service provider, and a processor 810 to process a message and a content transmitted and received by the transceiver 820. In an embodiment, the processor 810 may generate information included in a CR message to be transmitted by the transceiver 820, and analyze information included in an MRI message received by the transceiver 820.

In embodiments of the present disclosure which operate as described above, a problem that it is difficult to detect the number of users which use a service when a streaming service is provided through a multicast channel in an existing streaming service may be solved using an MRI message and a CRI message in a streaming service which supports an MMT-based media content, and it is possible to effectively manage a network and to seamlessly provide a streaming service according to an actual network situation (e.g., the number of users) using dynamic information at time when a streaming service is provided when a real-time media service is provided.

From a specific aspect, various embodiments of the present disclosure can be implemented as computer-readable code in a computer-readable recoding medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve various embodiments of the present disclosure.

The apparatus and method according to various embodiments of the present disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as CD, DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to various embodiments of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

The embodiments of the present disclosure described and illustrated in the specification and the drawings are mere examples provided to easily describe the technology of the present disclosure and help understanding of the present disclosure, not limiting the scope of the present disclosure. The foregoing embodiments of the present disclosure are purely exemplary and those skilled in the art will understand that various modifications can be made arid equivalent embodiments can be implemented. Accordingly, the true scope of the present disclosure should be defined by the appended claims.

The invention claimed is:

1. A method for controlling provision of a multimedia service, comprising:
transmitting, by a sending entity, to at least one receiving entity, a media resource identification (MRI) message including schedule information of media content including information indicating: a valid start time of a media session related to the media content and a valid stop time of the media session, location information of media content including information indicating: a sequence number of a first media processing unit (MPU) included in an asset related to the media content and a sequence number of a last MPU included in the asset, and delivery type information of the media content including information indicating whether a delivery type is broadcast delivery only, unicast delivery only, or hybrid delivery;
receiving, by the sending entity, from the at least one receiving entity, at least one consumption report (CR) message, each of the at least one CR message including identification information of an associated receiving entity among the at least one receiving entity and the delivery type information; and
counting, by the sending entity, a number of the at least one receiving entity which receives the media content and determining the delivery type to send the media content to the at least one receiving entity, based on the at least one CR message.

2. The method of claim 1,
wherein the MRI message further includes version information indicating a version of the MRI message, and
wherein the version information is used by the at least one receiving entity to check whether the MRI message is new.

3. The method of claim 1, wherein the at least one CR message further includes at least one of:
an identifier of a media package for the media content, and
an identifier of the asset included in the media package.

4. A method for receiving a multimedia service, comprising:
receiving, by a receiving entity, from a sending entity, a media resource identification (MRI) message including schedule information of media content including information indicating: a valid start time of a media session related to the media content and a valid stop time of the media session, location information of the media content including information indicating: a sequence number of a first media processing unit (MPU) included in an asset related to the media content and a sequence number of a last MPU included in the asset, and delivery type information of the media content including information indicating whether a delivery type is broadcast delivery only, unicast delivery only, or hybrid delivery; and
transmitting, by the receiving entity, to the sending entity, a consumption report (CR) message including identification information of the receiving entity and the delivery type information,
wherein the CR message is used by the sending entity to count a number of at least one receiving entity which receives the media content and to determine the delivery type to send the media content to the at least one receiving entity.

5. The method of claim 4,
wherein the MRI message further includes version information indicating a version of the MRI message, and
wherein the version information is used by the receiving entity to check whether the MRI message is new.

6. The method of claim 4, wherein the at least one CR message further includes at least one of:
an identifier of a media package for the media content, and
an identifier of the asset included in the media package.

7. A sending entity for controlling provision of a multimedia service, the sending entity comprising:
a transceiver; and
at least one processor configured to:
control the transceiver to transmit, to at least one receiving entity, a media resource identification (MRI) message including schedule information of media content including information indicating: a valid start time of a media session related to the media content and a valid stop time of the media session, location information of the media content including information indicating: a sequence number of a first media processing unit (MPU) included in an asset related to the media content and a sequence number of a last MPU included in the asset, and delivery type information of the media content including information indicating whether a delivery type is broadcast delivery only, unicast delivery only, or hybrid delivery,
control the transceiver to receive, from the at least one receiving entity, at least one consumption report (CR) message, each of the at least one CR message including identification information of an associated receiving entity among the at least one receiving entity and the delivery type information, and count a number of the at least one receiving entity which receives the media content and determine the delivery type to send the media content to the at least one receiving entity, based on the at least one CR message.

8. The sending entity of claim 7,
wherein the MRI message further includes version information indicating a version of the MRI message, and
wherein the version information is used by the at least one receiving entity to check whether the MRI message is new.

9. The sending entity of claim 7, wherein the at least one CR message further includes at least one of:
an identifier of a media package for the media content, and
an identifier of the asset included in the media package.

10. A receiving entity for receiving a multimedia service, the receiving entity comprising:

a transceiver; and at least one processor configured to control the transceiver to:

receive, from a sending entity, a media resource identification (MRI) message including schedule information of media content including information indicating: a valid start time of a media session related to the media content and a valid stop time of the media session, location information of the media content including information indicating: a sequence number of a first media processing unit (MPU) included in an asset related to the media content and a sequence number of a last MPU included in the asset, and delivery type information of the media content including information indicating whether a delivery type is broadcast delivery only, unicast delivery only, or hybrid delivery, and transmit, to the sending entity, a consumption report (CR) message including identification information of the receiving entity and the delivery type information, wherein the CR message is used by the sending entity to count a number of at least one receiving entity which receives the media content and to determine the delivery type to send the media content to the at least one receiving entity.

11. The receiving entity of claim 10, wherein the MRI message further includes version information indicating a version of the MRI message, and wherein the version information is used by the receiving entity to check whether the MRI message is new.

12. The receiving entity of claim 10, wherein the at least one CR message further includes at least one of:

an identifier of a media package for the media content, and an identifier of the asset included in the media package.

13. The method of claim 1, wherein the location information of the media content further includes location information of the asset.

14. The method of claim 4, wherein the location information of the media content further includes location information of the asset.

15. The sending entity of claim 7, wherein the location information of the media content further includes location information of the asset.

16. The receiving entity of claim 10, wherein the location information of the media content further includes location information of the asset.

* * * * *